(12) United States Patent
Zhou (10) Patent No.: US 10,701,333 B2
(45) Date of Patent: Jun. 30, 2020

(54) SYSTEM, ALGORITHMS, AND DESIGNS OF VIEW-OPTIMIZED ZOOM FOR 360 DEGREE VIDEO

(71) Applicant: Visbit Inc., Sunnyvale, CA (US)

(72) Inventor: Changyin Zhou, San Jose, CA (US)

(73) Assignee: Visbit Inc., Sunnyvale, CA (US)

( * ) Notice: Subject to any disclaimer, the term of this patent is extended or adjusted under 35 U.S.C. 154(b) by 0 days.

(21) Appl. No.: 15/953,799

(22) Filed: Apr. 16, 2018

(65) Prior Publication Data

US 2018/0302604 A1 Oct. 18, 2018

Related U.S. Application Data

(60) Provisional application No. 62/485,998, filed on Apr. 16, 2017.

(51) Int. Cl.
*H04N 13/117* (2018.01)
*H04N 13/161* (2018.01)
(Continued)

(52) U.S. Cl.
CPC ......... *H04N 13/117* (2018.05); *H04L 65/607* (2013.01); *H04N 13/161* (2018.05);
(Continued)

(58) Field of Classification Search
CPC .. H04N 13/117; H04N 13/161; H04N 13/366; H04N 19/115; H04N 19/167; H04N 19/176; H04L 65/607
(Continued)

(56) References Cited

U.S. PATENT DOCUMENTS 8,818,134 B2 * 8/2014 Sample ............... G09B 29/003
382/298

OTHER PUBLICATIONS

Hosseini et al., "Adaptive 360 VR Video Streaming: Divide and Conquer!", 2016 IEEE International Symposium on Multimedia (ISM), Dec. 13, 2016, pp. 107-110 (Year: 2016).*
(Continued)

*Primary Examiner* — Christopher S Kelley
*Assistant Examiner* — Asmamaw G Tarko
(74) *Attorney, Agent, or Firm* — McDonnell Boehnen Hulbert & Berghoff LLP (57) ABSTRACT

The present disclosure relates to systems and methods for streaming a tiled representation of video content based on a viewing direction and desired zoom level. Example methods include receiving information indicative of a view direction and a zoom level. The view direction and the zoom level correspond to a field of view including a first portion of the video content. A second portion of the video content is outside of the field of view. The method also includes selecting, from a plurality of viewports, an active viewport corresponding to the first portion of the video content. The active viewport specifies a set of one or more active tiles of a tiled representation of the video content. The method additionally includes comparing the set of one or more active tiles with a set of one or more previous active tiles and causing streaming and rendering to stop with respect to previous active tiles that are not in the set of one or more active tiles. The method includes causing streaming and rendering to commence with respect to active tiles that are not in the set of one or more previously active tiles.

23 Claims, 4 Drawing Sheets

(51) Int. Cl.
  *H04N 19/176* (2014.01)
  *H04N 19/167* (2014.01)
  *H04N 19/115* (2014.01)
  *H04N 13/366* (2018.01)
  *H04L 29/06* (2006.01)

(52) U.S. Cl.
  CPC ......... *H04N 13/366* (2018.05); *H04N 19/115* (2014.11); *H04N 19/167* (2014.11); *H04N 19/176* (2014.11); *H04L 67/38* (2013.01)

(58) Field of Classification Search
  USPC .......................................................... 348/36
  See application file for complete search history.

(56) References Cited

OTHER PUBLICATIONS

Maze et al., "Quality adaptation for title based streaming in DASH", ISO/IEC JTC1/SC29/WG11 MPEG2016/M39255, MPEG Meeting 116, Chengdu, CN, Oct. 21, 2016 (Year: 2016).*

Visbit Inc., "Making 12K 360° VR Streaming a Reality: Why and How We Did It", Mar. 24, 2017 <URL: https://medium.com/visbit> (Year: 2017).*

Hosseini et al., "Adaptive 360 VR video streaming: Divide and conquer," 2016 IEEE International Symposium on Multimedia (ISM), IEEE, 2016, 6 pages.

Mazé et al, "Quality adaptation for tile based streaming in DASH," International Organisation for Standardisation Organisation Internationale de Normalisation ISO/IEC JTC1/SC29/WG11 Coding of Moving Pictures and Audio, M39255, MPEG Meeting 116, Chengdu, CN, 2016, 4 pages.

Visbit Inc., "Making 12K 360° VR Streaming a Reality: Why and How We Did It," MEDIUM, https://medium.com/visbit, 2017, 6 pages.

Visbit Official Channel, "Introducing Visbit's View-Optimized Streaming Technology for 360° VR Video", YouTube, https://www.youtube.com/watch?v=DzZ7qn-wSMo> See transcript 00:15, 01:20-01:53, Aug. 6, 2016, 3 pages.

* cited by examiner

SYSTEM, ALGORITHMS, AND DESIGNS OF VIEW-OPTIMIZED ZOOM FOR 360 DEGREE VIDEO

CROSS-REFERENCE TO RELATED APPLICATION

This application claims priority to U.S. Provisional Application No. 62/485,998 filed Apr. 16, 2017, which is hereby incorporated by reference in its entirety.

BACKGROUND

Streaming 360-degree video content may provide immersive environments for virtual reality (VR) and augmented reality (AR) applications.

SUMMARY 360 degree video streaming often utilizes much higher bandwidth than video streaming of traditional formats (e.g., a small, rectangular-format field of view). For example, a conventional 360 degree video may include a resolution of 4 K or more. Such high resolutions may complicate the function of zooming into a limited area of a given scene. In such scenarios, even a 2× zoom requires a video stream resolution of 8 K or more. However, 8 K videos may be beyond the decoding and rendering limits of many devices, such as current smartphones and personal computers. In the present disclosure, systems and methods are described to help provide for highly-efficient zoom processes with reasonable bandwidth and decoder requirements, such that the processes are usable on devices that other comparable zoom processes are not. The systems and methods described herein may be performed without need for a customized video codec, and may therefore utilize existing hardware decoders on mobile devices or other video playback systems.

In a first aspect, a method is described. The method includes receiving information indicative of a view direction and a zoom level. The view direction and the zoom level correspond to a field of view including a first portion of the video content. A second portion of the video content is outside of the field of view. The method also includes selecting, from a plurality of viewports, an active viewport corresponding to the first portion of the video content. The active viewport specifies a set of one or more active tiles of a tiled representation of the video content. The method also includes comparing the set of one or more active tiles with a set of one or more previous active tiles. The method additionally includes causing streaming and rendering to stop with respect to previous active tiles that are not in the set of one or more active tiles. The method yet further includes causing streaming and rendering to commence with respect to active tiles that are not in the set of one or more previously active tiles.

In a second aspect, a system is described. The system includes a head-mountable display (HMD) having an inertial measurement unit (IMU) and a display configured to display video content. The system also includes a controller comprising a memory and at least one processor. The at least one processor is configured to execute instructions stored in the memory so as to carry out operations. The operations include receiving, from the IMU, information indicative of a view direction and a zoom level. The view direction and the zoom level correspond to a field of view including a first portion of the video content. A second portion of the video content is outside the field of view. The operations include selecting, from a plurality of viewports, an active viewport corresponding to the first portion of the video content. The active viewport specifies a set of one or more active tiles of a tiled representation of the video content. The operations include comparing the set of one or more active tiles with a set of one or more previous active tiles. The operations also include causing the HMD to stop streaming and rendering previous active tiles that are not in the set of one or more active tiles. The operations yet further include causing the HVID to commence streaming and rendering active tiles that are not in the set of one or more previously active tiles.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The level of detail that a viewer can observe or discern in a video presented via a display may be based on the smaller of: a resolution of the video or a resolution of the display. For example, when a 1080×1920 video is rendered on a 720×1280 display, viewers may be able to observe the image in a 720×1280 resolution. That is, some details specific to the native 1080×1920 video resolution may be lost. One way to show these lost details is to zoom into the video content. By zooming, a portion of the 1080×1920 video may be provided on a lower-resolution display. For example if the display has a resolution of 720×1280, a portion of the video corresponding to 720×1280 may be presented on the display so that all details in the video portion are rendered. In some embodiments, users/viewers may adjust the displayed video portion by scrolling the video up/down/left/right to see other areas of the video in full/native resolution. In some embodiments, users/viewers may also zoom in even further so that details can be shown in a larger size on the display.

In video streaming, it is not efficient to stream a high resolution video over a network only to display it on a low resolution screen. Such scenarios may also waste computation power at the streaming server and at the client. In some cases, a video may be streamed at a resolution that is close to display resolution. However, this may lead to a problem when zooming, since zoom requires a video resolution that is higher than the display resolution.

The zoom problem described above may become even more severe in 360 degree video streaming. Many viewers watch 360 degree videos via a virtual reality (VR) headset, which may include a high resolution display. As a result, many 360 degree videos have very high native resolutions (Ultra High Definition 4 K, or 3840×2160 pixels). To provide a 2× zoom with such content, one needs to stream an 8 K video (Ultra High Definition 8 K, or 7680×4320 pixels). 8 K video streaming is not only a big challenge with conventional network bandwidth, but also with regard to computational power on both the streaming server and client devices and with regard to the decoding capability on client devices.

Figure 1:
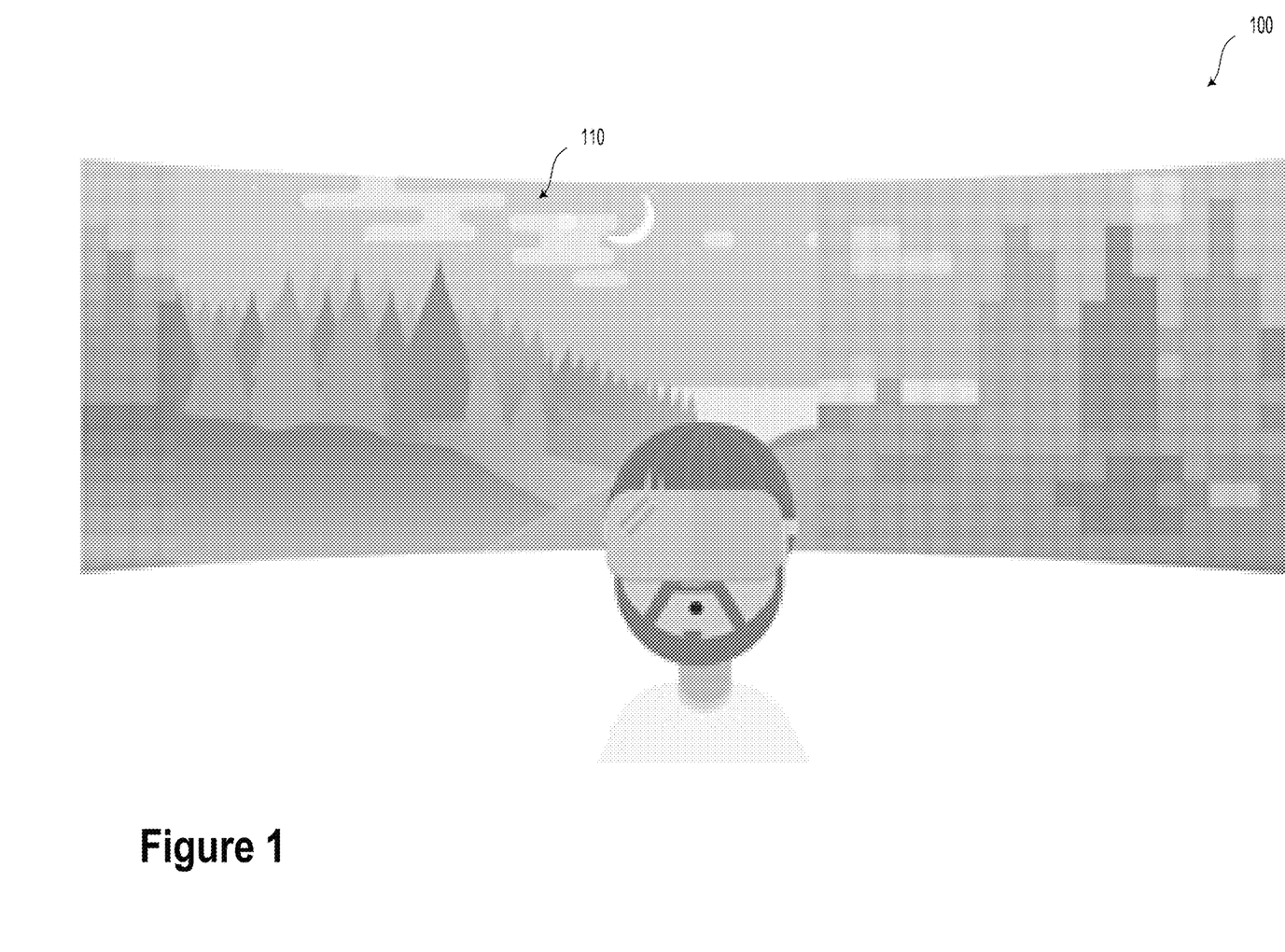
FIG. 1 illustrates a virtual reality viewing scenario, according to an example embodiment.

When viewing in a VR context, a viewer may be able to observe a small field of view of a 360 degree video at any given time. FIG. 1 illustrates a virtual reality 360 degree scenario 100, according to an example embodiment. As illustrated in FIG. 1, a viewer may view a field of view 110, which may include approximately 90 degrees of the full spherical/360 degree video. A view-optimized streaming system may stream and render high-resolution pixels within the viewed portion of the spherical video, in an effort reduce network traffic and computational cost. In the present disclosure, the view-optimized streaming method may be extended to enable efficient zoom.

Zooming into multiple perspectives within a 360 degree VR video poses additional challenges. First, while viewing a "zoomed-in" portion of the video, viewers may change their view directions very quickly using panning/scrolling controls, moving their head, or by otherwise changing their zoomed field of view. Accordingly, adjusting the zoomed field of view due to panning/scrolling/user movement should be seamless.

Also, most 360 degree videos are provided in high resolution (e.g., 4 K). Accordingly, most software decoders may not work well enough to provide seamless dynamic zoomed fields of view. In this disclosure, the described systems and methods include approaches that do not require customized software codecs and that may be applied to many existing playback systems.

II. Example Methods

A. Tiling for Zoom

Figure 2:
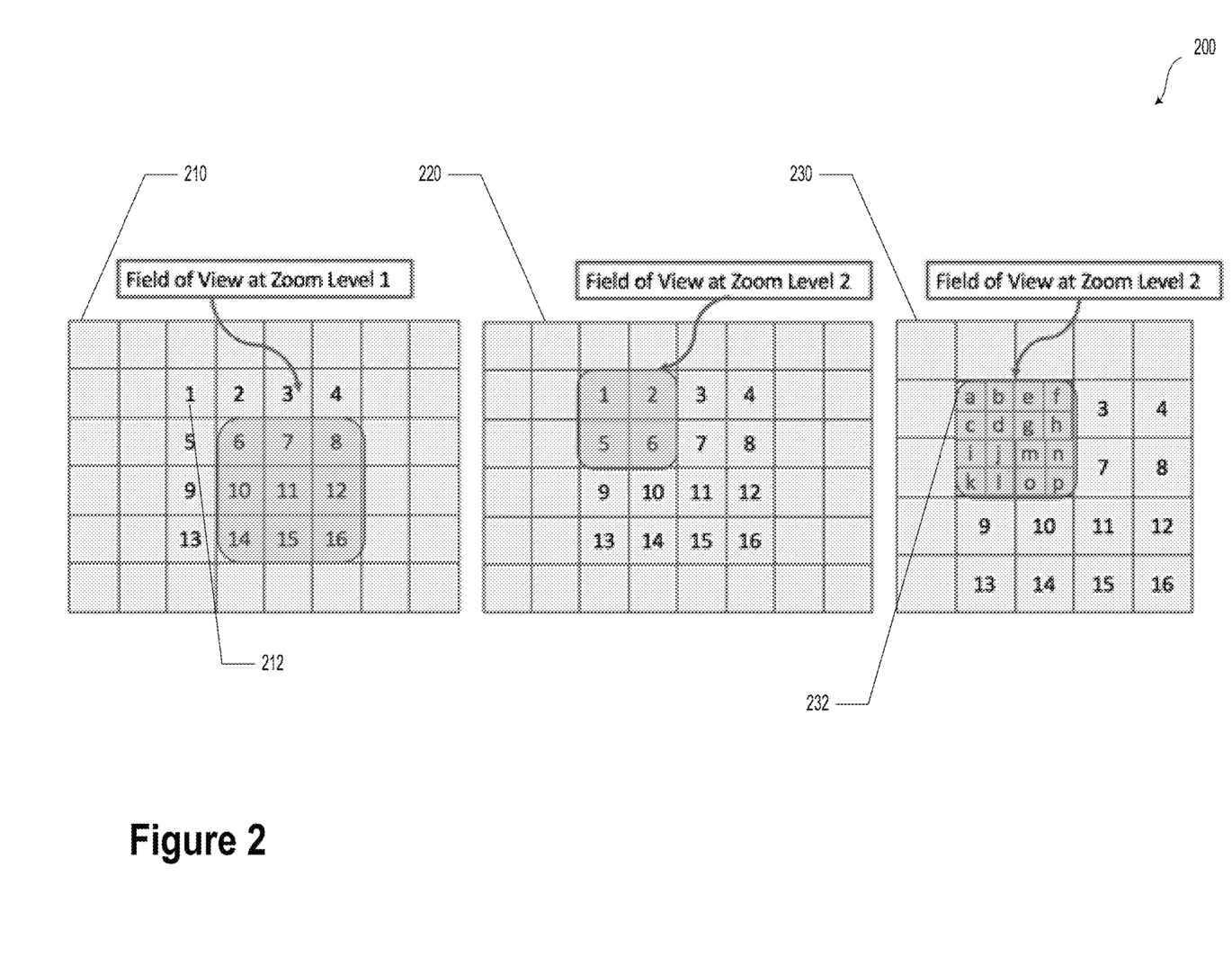
FIG. 2 illustrates several scenarios, according to example embodiments.

FIG. 2 illustrates several scenarios 210, 220, and 230, according to example embodiments. A video stream may be divided into a plurality of tile videos as illustrated in scenario 210. Namely, the plurality of tile videos may include portions of the video stream (e.g., tile 212). As illustrated in scenario 210, a viewer may be viewing a large field of view (FOV). In such a scenario, the viewer may need to view video tiles 6, 7, 8, 10, 11, 12, 14, 15, and 16 for full coverage of the present FOV.

As illustrated in scenario 220, a viewer may pan and/or zoom into the video stream to obtain further details or get a closer view of a given subject. In such a scenario, the viewer may be provided video tiles 1, 2, 5, and 6. Reducing the number of tiles after zooming has two direct benefits. 1) it may reduce the computational cost, so that the video player may increase playback frame-rate; and 2) it may reduce network traffic.

In scenario 210, at Zoom Level 1, 9 tiles may be streamed. In the case where each tile includes a pixel resolution of 256×256, the total resolution of the 9 tiles may be 768×768.

In scenario 220, at Zoom Level 2, only 4 tiles of resolution 256×256 are streamed, reducing bandwidth and computational cost.

Note that video resolution during streaming is mainly limited by 1) computational cost, and 2) network bandwidth. As reducing the overall number of presented tiles has benefited both factors, resources may be freed up so that video resolution of the presented tiles may be increased so that viewers can see more details after zoom.

For example, in reference to scenario 220, higher resolution may be achieved by increasing resolutions in each tile via an adaptive bitrate (ABR) algorithm. For example, the resolution of tiles 1, 2, 5, and 6 may be increased to 1024×1024, so that the total resolution is now 2048×2048, which is about 2.7× zoom.

In another embodiment, illustrated in scenario 230, higher resolution during zoom may be provided by deepening the tiling level and increasing tile resolution. At Zoom Level 2, we may stream 16 tiles from a, b, . . . , to p (e.g., subtiles 232). If each subtile has resolution of 256×256, the total resolution is now 1024×1024, which is about 1.3× zoom.

While certain tile resolutions are described herein, it will be understood that many different tile resolutions are contemplated herein and that some tile resolutions may be much higher than those noted herein. For example, tile resolutions may include millions or even billions of pixels.

B. Method for Tile-based View-Optimized Zoom for 360 Degree Video Streaming

Figure 3:
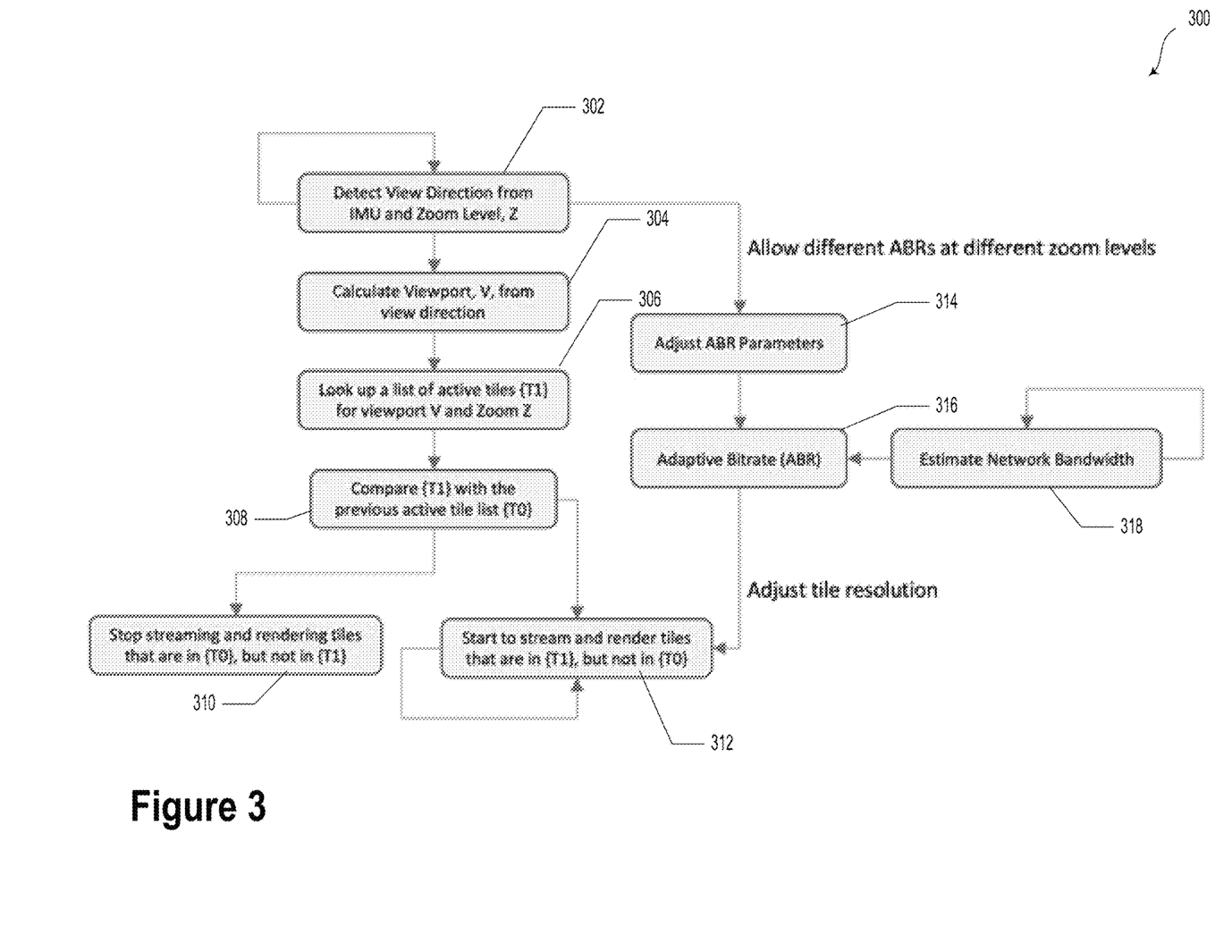
FIG. 3 illustrates a flowchart, according to an example embodiment.

FIG. 3 illustrates a method 300, according to an example embodiment. Method 300 may include various blocks or steps, which could be carried out in the illustrated order or in another order. Furthermore, more blocks or steps could be added. Alternatively, blocks or steps could be omitted, skipped, or otherwise deleted.

A method 300 for tile-based view-optimized zoom may initially include receiving pose information and zoom information. For example, block 302 may include obtaining information indicative of a pose of a head-mounted viewing device based on an inertial measurement unit (IMU). Such pose information may provide a present view direction.

Furthermore, block 302 may include receiving information indicative of a current zoom level.

The viewing sphere may be divided into a plurality of viewports. In some embodiments, a viewport may correspond to a particular viewing angle or view direction. Furthermore, the viewport "size" or the angular extents of the viewport may correspond to a given zoom level of a user's view. As illustrated in block 304, for a given view direction and a zoom level, an active viewport can be determined from the plurality of viewports. As illustrated in block 306, a list of active tiles associated with the active viewport can be calculated at runtime according to the present view direction and zoom level.

During runtime, the method 300 may obtain information about a view direction from the IMU at a high frequency (e.g., 240 Hz). Zoom commands or actions may be triggered by speed recognition, hand gesture, keyboard stroke, mouse gesture, touch pad interactions, and controller buttons. As such, the method 300 may include detecting zoom commands or actions in real time or near real time (e.g., within 100 milliseconds of user action). Once a present view direction and current zoom level are determined, the list of active tiles that are required for this view direction and zoom level may be obtained using a look-up table.

As illustrated in block 308, the new set of active tiles {t1} may be compared to a previous active list of tiles {t0}. As illustrated in block 310, the method 300 may include an action to stop streaming and/or rendering tiles that are in the old list {t0}, but not in the new list {t1}. Furthermore, as illustrated in block 312, the method 300 includes an action to start streaming and rendering tiles that are in {t1}, but not in {t0}.

The method 300 includes that whenever a new viewport is selected, an adaptive bitrate (ABR) unit is notified (block 314). The ABR unit determines at which resolution or bitrate each tile should be streaming at (block 316), by taking account of network bandwidth (block 316), zoom level, new tile list, and video bitrates. In some embodiments, the method 300 need not include an ABR unit.

In some embodiments, method 300 may include different tiles within a given field of view to have different resolutions and/or bitrates at the same time.

In another embodiment, the method 300 may include switching tiling schema as shown in FIG. 2 (e.g., is illustrated in scenarios 210, 220 and 230).

In yet another embodiment, switching from an old tile list {t0} to a new tile list {t1} may be performed without switching, pausing, or breaking the streaming connection. For example, a streaming tile queue may be used to scheduling tiles for streaming via the streaming connection. In such a scenario, the streaming tile queue playing the old tile list {t0} could be updated in real time based on the new tile list {t1}. In an example embodiment, upon receiving the new tile list {t1}, the streaming tile queue may adjusted to: 1) delete or ignore existing tiles in the queue that are not members of the new tile list {t1}; 2) retain the existing tiles in the queue that are members of both {t0} and {t1}; and 3) add tiles that are unique to {t1}.

C. Tiling Algorithm for View-Optimized Video Zoom

Figure 4:
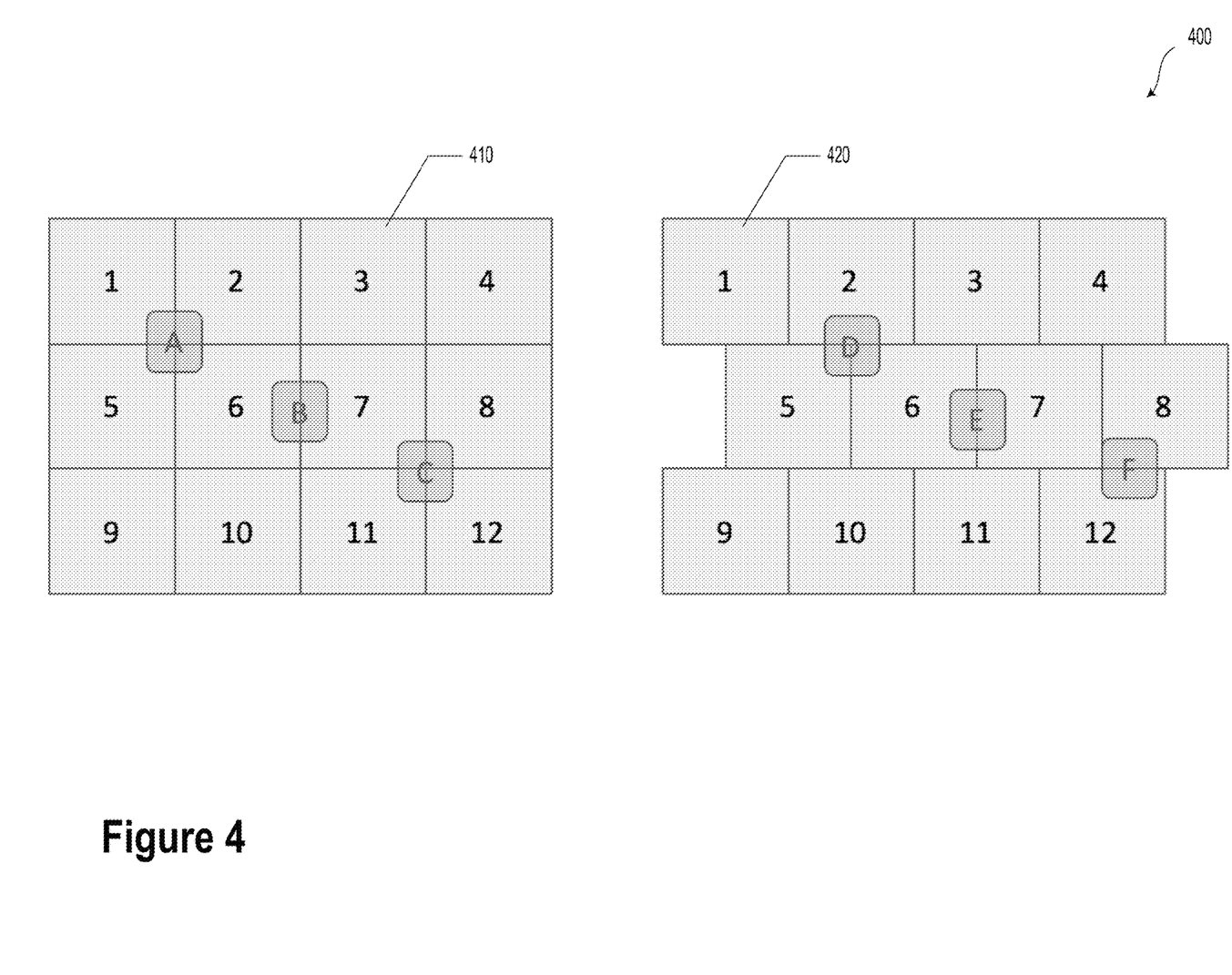
FIG. 4 illustrates various tiling schema, according to example embodiments.

As described herein, tiling of a video stream may be performed in various ways. FIG. 2 includes two tiling schemas (e.g., scenarios 220 and 230). FIG. 4 illustrates various tiling schema 400, according to example embodiments. In some tiling schema (e.g., tiling schema 410), as a user's view moves between different viewports, the maximal tile number may be 4. That is, when considering the boundaries of the tiles, spaces between tiles may include cross-shaped intersections (e.g., intersections A and C). However, under such tiling schema, panning in directions parallel and perpendicular to the tile boundaries may cause two new tiles to be loaded/streamed, which may be suboptimal.

Other tiling solutions and schema are possible and contemplated. For example, tiling schema 420 may reduce the active tile number to 3. Such a tiling schema may be termed "tri-tiling." Tri-tiling may be performed in various ways. For example, when defining tile boundaries, cross-shaped intersections may be avoided. In such a scenario, each intersection point may be adjacent to up to 3 tiles (e.g., intersection D and F). A tiling solution may be improved or adjusted by maximizing the linear distance between each pair of neighboring intersection points. Other types of tiling schema are possible and contemplated herein.

Methods described herein may include an optimization algorithm, which can be formulated as follows:

1. Start with an arbitrary valid tri-tiling solution of index k. By tri-tiling, each intersection point may have three neighbor tiles at most.
2. For each intersection point, $P_i$, in this tiling solution:
   a. a. Find any intersection point, $P_{j, i \neq j}$
   b. b. Compute $D_{ij}=L_2(P_i,P_j)$
   c. c. Let $M_i=\min_{(j \neq i)}\{D_{ij}\}$
3. Let the score for solution k be $S_k=\min_i\{M_i\}$.
4. Move to next tiling solution, and loop to Step 2.
5. Pick the best solution as: $k^*=\arg \max_k\{S_k\}$.

In another embodiment, $M_i$ may be defined differently, e.g, as the average of $D_{ij}$. $S_k$ may be defined differently as well, for example using the maximal number of tiles to cover an arbitrary view direction of a given field of view. A valid tiling solution may be manually designed or be machine-generated using certain rules.

In another embodiment, one may apply the above algorithm to a non-tri-tiling solution as well.

D. 360 Degree Video Zoom User Interaction Design

Zoom during 360 degree VR video playback can be performed in various ways. For example, a user may double tap a touch pad to trigger zooming, and double tap again to zoom out. One may double tap the touch pad to zoom in to one level, double tap again to another level, and so on.

In another embodiment, methods and systems described herein may utilize information from an IMU to zoom. For example, when a user leans forward, the IMU will detect a reduced (or increased) pitch position. Once this pitch position goes beyond a threshold, a zoom-in action may be triggered. Furthermore, when a user leans backward, the IMU will detect an increased (or reduced) pitch position. Based on the determined pitch position a zoom-out action may be triggered.

Additionally or alternatively to utilizing a position or angle threshold, systems and methods described herein may include an acceleration threshold to trigger a zoom action. In some embodiments, pattern recognition may be implemented with respect to the IMU signal so as to trigger a zoom action.

In another embodiment, an eye-tracking system may be utilized to trigger or stop zoom. For example, the eye-tracking system may be configured to recognize certain eye movements such as a quick wink or a double-wink.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. A method comprising:
   receiving information indicative of a view direction and a zoom level, wherein the view direction and the zoom level correspond to a field of view including a first portion of video content, wherein a second portion of the video content is outside of the field of view;
   selecting, from a plurality of viewports, an active viewport corresponding to the first portion of the video content, wherein the active viewport specifies a set of one or more active tiles of a tiled representation of the video content, wherein a tiling schema of the tiled representation of the video content comprises a tri-tiling format, wherein the tri-tiling format comprises a plurality of intersection points between tiles, wherein each intersection point of the plurality of intersection points is adjacent to up to three tiles of the tiled representation of the video content, wherein each tile of at least a portion of the tiles comprises four sides;
   comparing the set of one or more active tiles with a set of one or more previous active tiles; and
   updating a streaming tile queue by:
      causing streaming and rendering to stop with respect to previous active tiles that are not in the set of one or more active tiles; and
      causing streaming and rendering to commence with respect to active tiles that are not in the set of one or more previously active tiles, wherein causing streaming and rendering to stop or to commence are performed without switching, pausing, or breaking a streaming connection between a streaming server and a client device.

2. The method of claim 1, wherein the video content comprises a 360 degree video.

3. The method of claim 1, wherein the information is received from an inertial measurement unit (IMU).

4. The method of claim 3, wherein the IMU is configured to provide information about a pose of a head-mountable device (HMD).

5. The method of claim 1, wherein selecting the active viewport is based on a comparison between the view direction and the zoom level with at least one entry in a look-up table.

6. The method of claim 1, wherein selecting the active viewport comprises determining the set of one or more active tiles based on the view direction and the zoom level.

7. The method of claim 1, further comprising:
   selecting a new active viewport; and
   in response to determining the new active viewport, adjusting at least one adjustable bit rate parameter, wherein the adjustable bit rate parameters provide at least one of: a streaming rate or a resolution of at least one active tile.

8. The method of claim 1, further comprising:
   determining that the set of one or more active tiles comprises at least one new active tile not present in the set of one or more previous active tiles; and
   in response to determining the at least one new active tile, adjusting at least one adjustable bit rate parameter, wherein the adjustable bit rate parameters provide at least one of: a streaming rate or a resolution of the at least one new active tile.

9. The method of claim 1, wherein causing streaming and rendering to commence with respect to active tiles comprises determining an adaptive bit rate (ABR) for at least one active tile based on a network bandwidth and a resolution of the at least one active tile.

10. The method of claim 9, wherein determining an adaptive bit rate (ABR) for the at least one active tile comprises adjusting a streaming resolution of the at least one active tile.

11. The method of claim 1, further comprising determining a new tiled representation of the video content based on the zoom level.

12. The method of claim 1, wherein the tri-tiling format comprises at least one of: 1) a plurality of rows of tiles, wherein a first row of tiles is offset with respect to a second row of tiles; or 2) a plurality of columns of tiles, wherein a first column of tiles is offset with respect to a second column of tiles, such that at least some of the intersection points comprise t-shaped intersections that each form a border between three respective neighbor tiles.

13. A system comprising:
   a head-mountable display (HMD) comprising an inertial measurement unit (IMU) and a display configured to display video content; and
   a controller comprising a memory and at least one processor, wherein the at least one processor is configured to execute instructions stored in the memory so as to carry out operations, the operations comprising:
      receiving, from the IMU, information indicative of a view direction and a zoom level, wherein the view direction and the zoom level correspond to a field of view including a first portion of the video content, wherein a second portion of the video content is outside the field of view;

selecting, from a plurality of viewports, an active viewport corresponding to the first portion of the video content, wherein the active viewport specifies a set of one or more active tiles of a tiled representation of the video content, wherein a tiling schema of the tiled representation of the video content comprises a tri-tiling format, wherein the tri-tiling format comprises a plurality of intersection points between tiles, wherein each intersection point of the plurality of intersection points is adjacent to up to three tiles of the tiled representation of the video content, wherein at least a portion of the tiles comprise four sides;

comparing the set of one or more active tiles with a set of one or more previous active tiles; and updating a streaming tile queue by:
  causing the HMD to stop streaming and rendering previous active tiles that are not in the set of one or more active tiles; and
  causing the HMD to commence streaming and rendering active tiles that are not in the set of one or more previously active tiles, wherein causing the HMD to commence or stop streaming and rendering are performed without switching, pausing, or breaking a streaming connection between a streaming server and the HMD.

14. The system of claim 13, wherein the video content comprises a 360 degree video.

15. The system of claim 13, wherein the IMU is configured to provide information about a pose of the HMD.

16. The system of claim 13, wherein selecting the active viewport is based on a comparison between the view direction and the zoom level with at least one entry in a look-up table.

17. The system of claim 13, wherein selecting the active viewport comprises determining the set of one or more active tiles based on the view direction and the zoom level.

18. The system of claim 13, further comprising an adjustable bitrate unit, wherein the operations further comprise:
  determining a new active viewport; and
  in response to determining the new active viewport, adjusting at least one adjustable bit rate parameter of the adjustable bitrate unit, wherein the adjustable bit rate parameters provide at least one of: a streaming rate or a resolution of at least one active tile.

19. The system of claim 13, further comprising an adjustable bitrate unit, wherein the operations further comprise:
  determining the set of one or more active tiles comprises at least one new active tile not present in the set of one or more previous active tiles; and
  in response to determining the at least one new active tile, adjusting at least one adjustable bit rate parameter of the adjustable bitrate unit, wherein the adjustable bit rate parameters provide at least one of: a streaming rate or a resolution of the at least one new active tile.

20. The system of claim 13, further comprising an adjustable bitrate unit, wherein causing the HMD to commence streaming and rendering active tiles comprises causing the adjustable bitrate unit to determine an adaptive bit rate (ABR) for at least one active tile based on a network bandwidth and a resolution of the at least one active tile.

21. The system of claim 20, wherein determining the ABR for the at least one active tile comprises causing the adjustable bitrate unit to adjust a streaming resolution of the at least one active tile.

22. The system of claim 13, wherein the operations further comprise determining a new tiled representation of the video content based on the zoom level.

23. The system of claim 13, wherein the tri-tiling format comprises at least one of: 1) a plurality of rows of tiles, wherein a first row of tiles is offset with respect to a second row of tiles; or 2) a plurality of columns of tiles, wherein a first column of tiles is offset with respect to a second column of tiles, such that at least some of the intersection points comprise t-shaped intersections that each form a border between three respective neighbor tiles.

* * * * *